(12) United States Patent
Matsuda et al.

(10) Patent No.: US 8,372,570 B2
(45) Date of Patent: Feb. 12, 2013

(54) DEVELOPER CARRYING MEMBER, METHOD FOR MANUFACTURING SAME AND DEVELOPING APPARATUS

(75) Inventors: Takuma Matsuda, Suntou-gun (JP); Masayoshi Shimamura, Yokohama (JP); Yasutaka Akashi, Yokohama (JP); Satoshi Otake, Numazu (JP); Minoru Ito, Susono (JP); Yoshiyuki Takayama, Tokyo (JP); Kazuhito Wakabayashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 13/184,450

(22) Filed: Jul. 15, 2011

(65) Prior Publication Data
US 2011/0268477 A1 Nov. 3, 2011

Related U.S. Application Data

(63) Continuation of application No. PCT/JP2011/001816, filed on Mar. 28, 2011.

(30) Foreign Application Priority Data

Apr. 9, 2010 (JP) ................................. 2010-090967

(51) Int. Cl.
*G03G 13/08* (2006.01)
*G03G 15/08* (2006.01)

(52) U.S. Cl. ...................... 430/123.3; 399/265; 399/267; 399/276; 399/279; 399/286

(58) Field of Classification Search .......................... None
See application file for complete search history.

(56) References Cited

U.S. PATENT DOCUMENTS

| 6,258,498 | B1 | 7/2001 | Kawahara et al. | |
|---|---|---|---|---|
| 7,797,833 | B2 | 9/2010 | Nakamura et al. | |
| 8,059,997 | B2 * | 11/2011 | Otake et al. | 399/286 |
| 8,295,745 | B2 * | 10/2012 | Matsuda et al. | 399/286 |
| 8,298,658 | B2 * | 10/2012 | Shimamura et al. | 428/323 |
| 2010/0028792 | A1 | 2/2010 | Otake et al. | |
| 2010/0202801 | A1 | 8/2010 | Otake et al. | |

FOREIGN PATENT DOCUMENTS

| JP | 9-274374 A | 10/1997 |
|---|---|---|
| JP | 2001-312136 A | 11/2001 |
| JP | 2009-75383 A | 4/2009 |
| JP | 2010-8878 A | 1/2010 |
| JP | 2010-170105 A | 8/2010 |

OTHER PUBLICATIONS

International Search Report dated Jun. 7, 2011 in International Application No. PCT/JP2011/001816.
PCT International Search Report and Written Opinion of the International Searching Authority, International Application No. PCT/JP2011/001816, Mailing Date Jun. 7, 2011.
Takayama, et al., U.S. Appl. No. 13/182,753, filed Jul. 14, 2011.
PCT International Preliminary Report on Patentability dated Nov. 6, 2012 in International Application No. PCT/JP2011/001816.

* cited by examiner

*Primary Examiner* — Sheeba Ahmed
(74) *Attorney, Agent, or Firm* — Fitzpatrick, Cella, Harper & Scinto

(57) ABSTRACT

The present invention provides a developer carrying member capable of maintaining excellent charge imparting property even under long-term use. The present invention relates to a developer carrying member including a substrate and a resin layer, wherein the resin layer includes an acrylic resin having three specific structural units and electroconductive particles.

5 Claims, 4 Drawing Sheets

DEVELOPER CARRYING MEMBER, METHOD FOR MANUFACTURING SAME AND DEVELOPING APPARATUS

CROSS-REFERENCE TO RELATED APPLICATIONS

This application is a continuation of International Application No. PCT/JP2011/001816, filed Mar. 28, 2011, which claims the benefit of Japanese Patent Application No. 2010-090967, filed Apr. 9, 2010.

BACKGROUND OF THE INVENTION

1. Field of the Invention

The present invention relates to a developer carrying member used for an electrophotographic apparatus, a method for manufacturing the same and a developing apparatus.

2. Description of the Related Art

For the purpose of imparting appropriate triboelectric charge amounts to developers (toners) used for forming electrophotographic images, Japanese Patent Application Laid-Open No. 2001-312136 has proposed a developer carrying member including, as a charge controlling agent, in a resin layer a quaternary ammonium base-containing copolymer. There has been proposed a developing apparatus which increases the triboelectric charge amount of a toner by using a developer carrying member including in a resin layer a quaternary ammonium base-containing copolymer.

SUMMARY OF THE INVENTION

According to the results of a study performed by the present inventors, however, in the developer carrying member according to Japanese Patent Application Laid-Open No. 2001-312136, the compatibility between the binder resin in the resin layer and the quaternary ammonium base-containing copolymer in the resin layer is not necessarily satisfactory, and the dispersion uniformity of the charge controlling agent and the electroconductive particles is degraded as the case may be. In such cases, in particular, in one-component developers, triboelectric charging failure such as local toner charge-up is sometimes caused. Further, in the case that the resin layer is formed only with the quaternary ammonium base-containing copolymer, there is a problem in the durability of the resin layer.

Accordingly, the present invention is directed to provide a developer carrying member being excellent in the uniform triboelectric charge imparting property to the toner and having the charge imparting performance hardly degraded even by long-term use. Further, the present invention is directed to provide a developing apparatus capable of stably forming high-quality electrophotographic images.

According to one aspect of the present invention, there is provided a developer carrying member comprising a substrate and a resin layer, wherein the resin layer comprises an acrylic resin comprising a unit represented by the following formula (1), a unit represented by the following formula (2) and a unit represented by the following formula (3), and electroconductive particles:

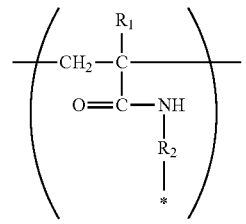

wherein $R_1$ represents a hydrogen atom or a methyl group, and $R_2$ represents an alkylene group having 1 to 4 carbon atoms; and the symbol * represents a binding portion to the portion represented by the symbol ** in formula (3),

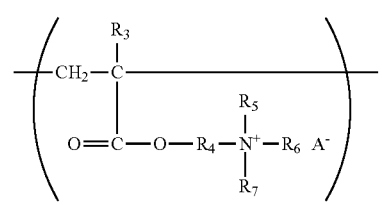

wherein $R_3$ represents a hydrogen atom or a methyl group, $R_4$ represents an alkylene group having 1 to 4 carbon atoms, $R_5$, $R_6$ and $R_7$ each independently represent an alkyl group having 1 to 18 carbon atoms, and $A^-$ represents an anion, and

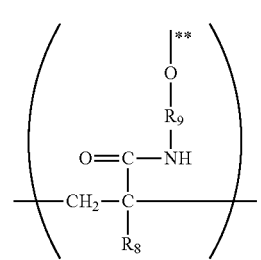

wherein $R_8$ represents a hydrogen atom or a methyl group, and $R_9$ represents an alkylene group having 1 to 4 carbon atoms; and the symbol ** represents a binding portion to the portion represented by the symbol * in formula (1).

According to another aspect of the present invention, there is provided a method for manufacturing a developer carrying member comprising a substrate and a resin layer, wherein the resin layer comprises at least an acrylic resin and electroconductive particles, and the acrylic resin is obtained by the following polymerization reactions [A] and [B]:

polymerization reaction [A]: a radical polymerization reaction between the monomer represented by the following formula (5) and the monomer represented by the following formula (6); and polymerization reaction [B]: dehydration polycondensation reaction between the hydroxyl groups of the monomers represented by the following formula (5):

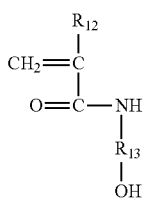

(5)

wherein $R_{12}$ represents a hydrogen atom or a methyl group, and $R_{13}$ represents a alkylene group having 1 to 4 carbon atoms,

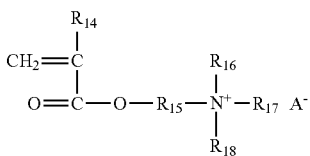

(6)

wherein $R_{14}$ represents a hydrogen atom or a methyl group, $R_{15}$ represents an alkylene group having 1 to 4 carbon atoms, $R_{16}$, $R_{17}$ and $R_{18}$ each independently represent an alkyl group having 1 to 18 carbon atoms, and $A^-$ represents an anion.

According to further aspect of the present invention, there is provided a developing apparatus according to the present invention includes a negatively chargeable developer which comprises toner particles, a container containing the developer, a developer carrying member for carrying and conveying the developer stored in the container, and a developer thickness regulating member, wherein the developer carrying member is the above-described developer carrying member.

According to the present invention, it is possible to obtain a developer carrying member being high in the uniform triboelectric charge imparting capability to the toner and having the charge imparting capability hardly changed even by long-term use, and a developing apparatus.

Further features of the present invention will become apparent from the following description of exemplary embodiments with reference to the attached drawings.

DESCRIPTION OF THE EMBODIMENTS

Figure 1:
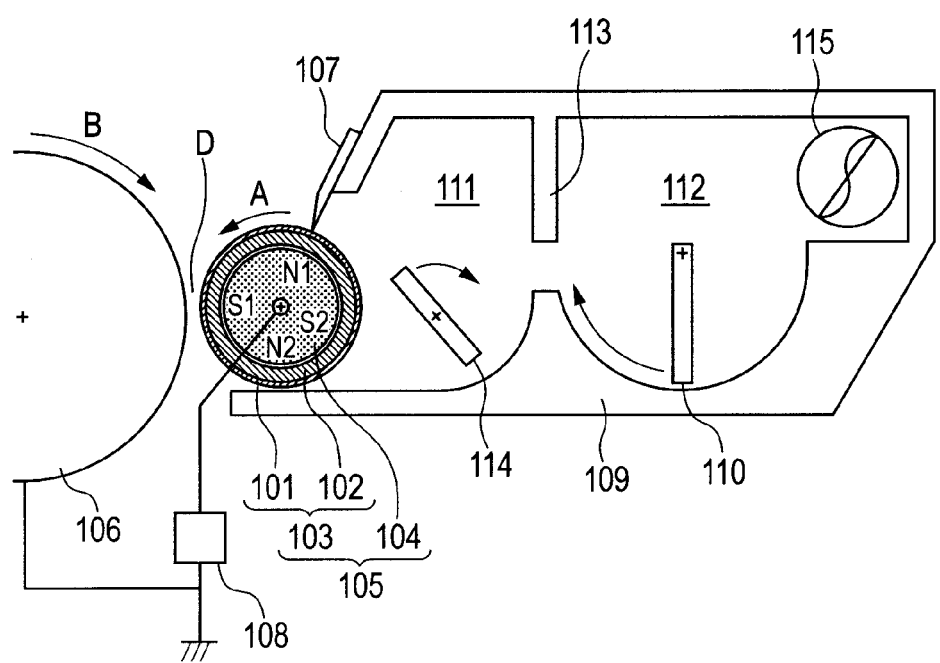
FIG. 1 is a cross sectional view illustrating an embodiment of the developing apparatus according to the present invention.

As shown in FIG. 1, the developer carrying member according to the present invention includes a substrate 102 and a resin layer 101 formed on the circumference surface of the substrate 102. The resin layer 101 includes an acrylic resin including three units each having a specific structure and includes electroconductive particles.

[Acrylic Resin]

The acrylic resin according to the present invention has a role of increasing the triboelectric charge amount of the triboelectrically negatively chargeable toner. The presence of cross-linked structures in the acrylic resin enables the acrylic resin to increase the strength thereof as the binder resin and to thereby improve the abrasion resistance thereof. Consequently, even under long-term use, high image densities can be maintained and occurrence of toner scattering can be suppressed. The acrylic resin that provides such effects includes a unit (hereinafter also referred to as "the unit (1)") represented by the following formula (1), a unit (hereinafter also referred to as "the unit (2)") represented by the following formula (2) and a unit (hereinafter also referred to as "the unit (3)") represented by the following formula (3).

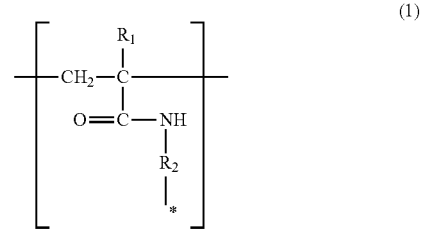

(1)

wherein $R_1$ represents a hydrogen atom or a methyl group, and $R_2$ represents an alkylene group having 1 to 4 carbon atoms; and the symbol * represents a binding portion to the portion represented by the symbol ** in formula (3),

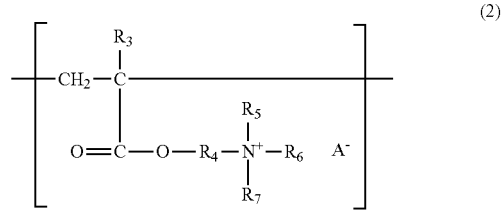

(2)

wherein $R_3$ represents a hydrogen atom or a methyl group, $R_4$ represents an alkylene group having 1 to 4 carbon atoms, $R_5$, $R_6$ and $R_7$ each independently represent an alkyl group having 1 to 18 carbon atoms, and $A^-$ represents an anion, and

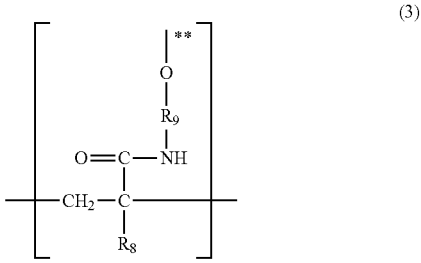

(3)

wherein $R_8$ represents a hydrogen atom or a methyl group, and $R_9$ represents an alkylene group having 1 to 4 carbon atoms; and the symbol ** represents a binding portion to the portion represented by the symbol * in formula (1).

The unit (1) and the unit (3) are chemically bonded to each other so as to be three-dimensionally cross-linked, and hence the acrylic resin according to the present invention has a high strength. Accordingly, the resin layer of the developer carrying member according to the present invention exhibits a high abrasion resistance. Preferably, $R_1$ in formula (1) and $R_8$ in formula (3) are the same as each other, and $R_2$ in formula (1) and $R_9$ in formula (3) are the same as each other. Such sameness allows the units (1) and (3) to be produced from the same monomer.

The unit (2) contributes to the improvement in the developer carrying member to increase the triboelectric charge amount of the triboelectrically negatively chargeable toner. In the case that the acrylic resin has a unit in which any one of $R_5$, $R_6$ and $R_7$ in formula (2) is a long chain alkyl group (having 19 or more carbon atoms) exceeding an octadecyl group, the crystallinity of the acrylic resin tends to increase, and the compatibility of the acrylic resin with the solvent tends to decrease relatively. Accordingly, for the purpose of obtaining a uniform resin layer, $R_5$ to $R_7$ are each to be an alkyl group having 1 to 18 carbon atoms. One or more of the alkyl groups selected from $R_5$, $R_6$ and $R_7$ in formula (2) designed to be long chain alkyl groups having 8 to 18 carbon atoms preferably enables to more increase the triboelectric charging performance of the triboelectrically negatively chargeable toner of the developer carrying member. The $A^-$ in formula (2) represents a halide anion; the anion of an inorganic acid such as hydrochloric acid, hydrobromic acid, sulfuric acid, phosphoric acid or nitric acid; or anion of an organic acid such as a carboxylic acid or a sulfonic acid. The $A^-$ is more preferably methylsulfonic acid ion or paratoluenesulfonic acid ion, for the purpose of further improving the triboelectric charge amount of the triboelectrically chargeable toner.

For the purpose of more satisfactorily controlling the charge imparting capability of the above-described acrylic resin, another unit (hereinafter also referred to as "the unit (7)") represented by the following formula (7) may also be included, in addition to the above-described units (1) to (3).

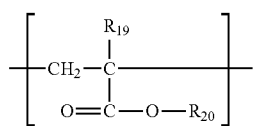

wherein $R_{19}$ represents a hydrogen atom or a methyl group, and $R_{20}$ represents an alkyl group having 1 to 18 carbon atoms.

The acrylic resin usable in the present invention can be produced by the radical polymerization reaction [A] between a hydroxyl group-modified acrylic monomer and an acrylic monomer having a quaternary ammonium base, and by the dehydration polycondensation reaction [B] between the hydroxyl groups. Examples of the hydroxyl group-modified acrylic monomer include the monomer (hereinafter also referred to as "the monomer (5)") represented by the following formula (5):

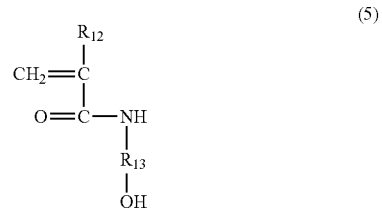

In formula (5), $R_{12}$ represents a hydrogen atom or a methyl group, and $R_{13}$ represents an alkylene group having 1 to 4 carbon atoms. Of the monomers represented by formula (5), N-methylolacrylamide and N-ethylolacrylamide are preferable from the viewpoint of the reaction control.

Examples of the acrylic monomer having a quaternary ammonium base includes the monomer (hereinafter also referred to as "the monomer (6)") represented by the following formula (6):

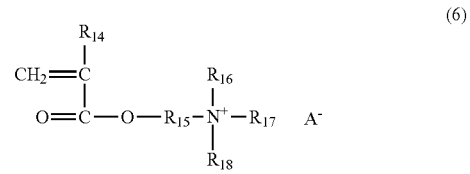

In formula (6), $R_{14}$ represents a hydrogen atom or a methyl group, $R_{16}$, $R_{17}$ and $R_{18}$ each independently represent an alkyl group having 1 to 18 carbon atoms, $R_{16}$ represents an alkylene group having 1 to 4 carbon atoms, and $A^-$ represents an anion. The monomers in which any one of $R_{16}$, $R_{17}$ and $R_{18}$ in formula (6) is a long chain alkyl group (having 19 or more carbon atoms) exceeding in the number of carbon atoms an octadecyl group are high in crystallinity and are relatively decreased in the compatibility with the solvent. Accordingly, from the viewpoint of the easiness in production of the acrylic resin, $R_{16}$, $R_{17}$ and $R_{18}$ are each designed to be an alkyl group having 1 to 18 carbon atoms. The case of the monomer in which at least one alkyl group of $R_{16}$, $R_{17}$ and $R_{18}$ in formula (6) is a long chain alkyl group having 8 to 18 carbon atoms is more preferable because in this case the resin layer is capable of more increasing the triboelectric charge amount of the triboelectrically negatively chargeable toner. By producing with the monomer (5) and the monomer (6), the acrylic resin of the present invention can be easily obtained.

[Polymerization Reaction]

The radical polymerization reaction [A] and the dehydration polycondensation reaction [B] between the hydroxyl groups may be performed simultaneously; however, it is preferable to perform the dehydration polycondensation reaction [B] between the hydroxyl groups after the radical polymerization reaction [A] because the amount of the remaining monomers can be reduced.

For the radical polymerization reaction [A], heretofore known polymerization methods such as bulk polymerization, suspension polymerization and emulsion polymerization can be used; preferable of these is a solution polymerization method because of the easiness in controlling the reaction. The solvent to be used in the solution polymerization method may be a solvent capable of uniformly dissolving the acrylic resin; preferable are the lower alcohols such as methanol, ethanol, n-butanol and isopropyl alcohol. By adopting a lower alcohol, the coating material prepared from the acrylic resin cab be low in viscosity and hence the film formability of the resin layer tends to be satisfactory. Where necessary, other solvents may also be used as mixed in the lower alcohol solvent. The ratio between the solvent and the monomer component used in the solution polymerization method is preferably such that the polymerization is performed with the solvent in an amount of 25 parts by mass or more and 400 parts by mass or less in relation to 100 parts by mass of the monomer component, because of the control of an appropriate viscosity. The polymerization of the monomer mixture can be performed, for example, by heating the monomer mixture in the presence of the polymerization initiator in an inert gas atmosphere at a temperature of 50° C. or higher and 100° C. or lower. Examples of the polymerization initiator include the following: t-butylperoxy-2-ethyl hexanoate, cumyl perpivalate, t-butylperoxy laurate, benzoyl peroxide, lauroyl peroxide, octanoyl peroxide, di-t-butyl peroxide, t-butylcumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), and dimethyl 2,2'-azobis(2-methylpropionate). The afore-mentioned polymerization initiators can be used solely or in combination with two or more of them. Usually the polymerization is started by adding the polymerization initiator to a monomer solution; however, for the purpose of reducing the amount of the unreacted monomers, part of the polymerization initiator may be added in the midway of the polymerization. Methods for promoting polymerization with irradiation of ultraviolet light or electron beam can also be used, and such methods may also be combined. The used amount of the polymerization initiator is 0.05 part by mass or more and 30 parts by mass or less, in particular, 0.1 part by mass or more and 15 parts by mass or less in relation to 100 parts by mass of the monomer component. By setting the used amount of the polymerization initiator so as to fall within such a range, the amount of the remaining monomer can be reduced, and the control of the molecular weight of the acrylic resin is facilitated. The temperature of the polymerization reaction can be set according to the solvent to be used, the polymerization initiator to be used and the composition of the monomer component to be used; however, the polymerization is preferably performed at a temperature of 40° C. or higher and 150° C. or lower, for the purpose of making the polymerization reaction stably proceed. As the monomer (6), the monomer produced by quaternarizing with a quaternarizing agent the monomer (hereinafter also referred to as "the monomer (8)") represented by the following formula (8) can be used.

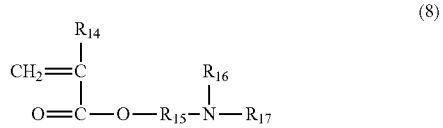

(8)

In formula (8), $R_{14}$ represents a hydrogen atom or a methyl group, $R_{16}$ and $R_{17}$ each represent an alkyl group having 1 to 18 carbon atoms, and $R_{15}$ represents an alkylene group having 1 to 4 carbon atoms. Specific examples of the quaternarizing agent includes the following: butyl bromide, 2-ethylhexyl bromide, octyl bromide, lauryl bromide, stearyl bromide, butyl chloride, 2-ethylhexyl chloride, octyl chloride and lauryl chloride. The used amount of the quaternarizing agent is preferably 0.8 mole or more and 1.0 mole or less in relation to 1 mole of the monomer (8). Such quaternarization of a monomer can be performed, for example, by heating the monomer and the quaternarizing agent in a solvent at a temperature of 60° C. or higher and 90° C. or lower.

It is also possible to obtain the intended quaternary ammonium base-containing acrylic copolymer by copolymerizing the monomer (5) and the monomer (8) and then further quaternarizing the resulting copolymer with the quaternarizing agent. Alternatively, for example, the monomer (8) is quaternarized with alkyl halide such as methyl chloride and then copolymerized with the monomer (5). The obtained quaternary ammonium base-containing acrylic copolymer is treated for counterion exchange with an acid such as p-toulenesulfonic acid or hydroxynaphthalenesulfonic acid, and thus can also be converted into a quaternary ammonium base-containing acrylic copolymer in which the anion is converted into an intended anion species.

The dehydration polycondensation reaction [B] between the hydroxyl groups can be performed at the same time with the volatilization of the solvent by heating, at a temperature of 100° C. or higher and 160° C. or lower, the acrylic resin solution prepared by radical polymerization reaction based on the solution polymerization method. When the dehydration polycondensation reaction [B] between the hydroxyl groups proceeds to an excessive extent, the acrylic resin is crosslinked to make difficult the molding processing of the acrylic resin, and hence it is preferable to form the resin layer on the substrate and then heat the resin layer. For the purpose of controlling the charge imparting capability of the acrylic resin or controlling the solubility of the acrylic resin to the solvent, monomers other than those described above may also be used at the time of the radical polymerization. Examples of such other monomers includes the monomers represented by the following formula (9):

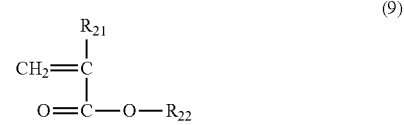

(9)

In formula (9), $R_{21}$ represents a hydrogen atom or a methyl group, and $R_{22}$ represents an alkyl group having 1 to 18 carbon atoms. The number of the carbon atoms in $R_{22}$ in formula (9) can be appropriately set in order to control the solubility to the solvent. The composition proportions of the individual units in the acrylic resin are preferably such that, when the total number of moles of the units (1) and (3) is represented by a, the number of moles of the unit (2) is represented by b, and the number of moles of the other unit (7) is represented by c, $a/(a+b+c)$ is 0.3 or more and 0.8 or less, $b/(a+b+c)$ is 0.2 or more and 0.7 or less, and $c/(a+b+c)$ is 0.0 or more and 0.5 or less. When $a/(a+b+c)$ is 0.3 or more, the number of the crosslinking points in the acrylic resin is increased so as to facilitate the improvement of the abrasion resistance. When $b/(a+b+c)$ is 0.2 or more, the charge imparting capability of the acrylic resin to the toner is increased so as to facilitate the increase of the triboelectric charge amount of the triboelectrically negatively chargeable toner. When $c/(a+b+c)$ is 0.5 or less, it is facilitated to obtain the above-described effects due to the introduction of the units (1) to (3). In the above-described composition proportions, when the unit (1) and the unit (3) included in the acrylic resin are each composed of a plurality of species, a is defined by the total number of moles of the unit composition proportions of the pluralities of species satisfying the structures of the unit (1)

and the unit (3); when the unit (2) included in the acrylic resin is composed of a plurality of species, b is defined by the total number of moles of the unit composition proportions of the plurality of species satisfying the structure of the unit (2); and when the unit (7) included in the acrylic resin is composed of a plurality of species, c is defined by the total number of moles of the unit composition proportions of the plurality of species satisfying the structure of the unit (7).

[Phenolic Resin and Melamine Resin]

For the purpose of improving the abrasion resistance of the resin layer, preferably the resin layer includes a phenolic resin or a melamine resin, and the above-described acrylic resin includes the unit (hereinafter also referred to as "the unit (4)") represented by the following formula (4) and the unit is bound to the phenolic resin or the melamine resin at the position represented by the symbol *** in formula (4).

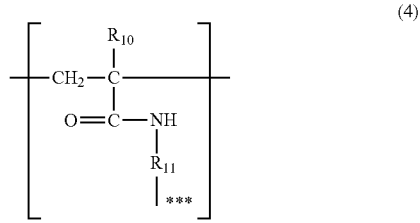

(4)

In formula (4), $R_{10}$ represents a hydrogen atom or a methyl group, and $R_{11}$ represents an alkylene group having 1 to 4 carbon atoms. The presence of the phenolic resin or the melamine resin causes the dehydration polycondensation reaction between the methylol group contained in the phenolic resin or the melamine resin and the hydroxyl group-modified acrylic monomer. Consequently, the acrylic resin incorporates the unit (4) so as to more toughen the crosslinked structure of the acrylic resin. The more toughened is the crosslinked structure of the acrylic resin, the more facilitated is the improvement of the abrasion resistance of the resin layer, and hence the more facilitated is the suppression of the variation of the development properties of the developer carrying member during the endurance use. The acrylic resin of the present invention undergoes the reaction with the phenolic resin or the melamine resin so as to make dense the crosslinked structure, and the uniform distribution of the acrylic resin in the resin layer is facilitated to more easily stabilize the triboelectric charge imparting to the toner. When the acrylic resin of the present invention is used in combination with a thermosetting resin such as a phenolic resin or a melamine resin, first the radical polymerization reaction [A] between the hydroxyl group-modified acrylic monomer and a quaternary ammonium base-containing acrylic monomer is performed. Then, by performing the dehydration polycondensation reactions [B] and [C] between the hydroxyl groups, the acrylic resin in combination with the phenolic resin or the melamine resin can be produced. The dehydration polycondensation reaction [B] between the hydroxyl groups means the reaction between the hydroxyl groups of the hydroxyl group-modified acrylic monomer (5). The dehydration polycondensation reaction [C] between the hydroxyl groups means the reaction between the methylol group of the resol-type phenolic resin or the melamine resin and the hydroxyl group of the hydroxyl group-modified acrylic monomer (5).

[Electroconductive Particles]

In the present invention, for the purpose of regulating the resistance value of the resin layer, electroconductive particles are included in the resin layer. Examples of the materials for the electroconductive particles include metals, metal oxides and carbon materials such as carbon black and graphite. Among these, preferably used is carbon black, in particular, electroconductive amorphous carbon. A standard of the volume resistance value of the resin layer is $10^4$ Ω·cm or less, in particular, $10^{-3}$ Ω·cm or more and $10^3$ Ω·cm or less.

[Surface Roughness of Resin Layer]

A standard of the surface roughness of the resin layer is, in terms of the arithmetic mean roughness Ra (JIS B0601-2001), 0.3 μm to 2.5 Examples of the method for controlling the roughness of the resin layer to be an intended value include a method in which roughness is imparted by sand blasting to the substrate on which the resin layer is to be formed and then the resin layer is formed on the substrate, and a method in which unevenness-imparting particles are included in the resin layer.

[Method for Preparing Resin Layer]

Next, a method for preparing the resin layer is described. The resin layer can be formed, for example, by the following steps:

[1] step of preparing an acrylic resin solution by radical polymerization of individual monomers;

[2] step of preparing a coating material by dispersing and mixing electroconductive particles in the acrylic resin solution;

[3] step of coating the substrate with the dispersed and mixed coating material; and

[4] step of drying and solidifying or curing the coating material applied to the substrate.

The solution polymerization method is preferable as the radical polymerization (the polymerization reaction [A]) method in the step [1]. For dispersing and mixing in the step [2], heretofore known dispersion apparatuses utilizing beads such as a sand mill, a paint shaker, a dyno-mill and a pearl mill can be suitably used. When a thermosetting resin is used in combination in addition to the acrylic resin of the present invention, or when another material such as unevenness-imparting particles is used, such a component is preferably dispersed and mixed midway in the step [2].

As the method for coating the substrate with the coating material in the step [3], heretofore known methods such as a dipping method, a spraying method and a roll coating method are applicable; for the purpose of uniformizing the individual components, the spraying method is preferable.

For drying and solidifying or curing in the step [4], heretofore known heating apparatuses such as a hot air drying furnace and an infrared heater can be suitably used. In this step, the dehydration polycondensation reaction (the polymerization reaction [B]) between the hydroxyl groups of the crosslinking-type acrylic monomer occurs.

When a resol-type phenolic resin or a melamine resin is also used in addition to the acrylic resin, the dehydration polycondensation (the polymerization reaction [C]) between the methylol group of the resol-type phenolic resin or the methylol group of the melamine resin and the hydroxyl group of the hydroxyl group-modified acrylic monomer occurs.

The thickness of the resin layer is preferably 50 μm or less, more preferably 40 μm or less and furthermore preferably 4 μm to 30 μm, because of the easiness in molding in a uniform thickness.

As the method for drying and solidifying or curing of the step [4], the concerned treatment is preferably performed at a temperature of 100° C. or higher and 160° C. or lower by using a heretofore known apparatus such as a hot air dryer or an infrared heater.

[Substrate]

Examples of the substrate 102 includes a cylindrical member, a columnar member and a belt-shaped member. Examples of the material for the substrate include nonmagnetic metals and alloys such as aluminum, stainless steel and brass.

The developing apparatus according to the present invention includes a negatively chargeable developer including toner particles, a vessel housing the developer, a developer carrying member for carrying and conveying the developer stored in the vessel and a developer thickness controlling member. While the developer layer is being formed on the developer carrying member with the aid of the developer thickness controlling member, the developer on the developer carrying member is conveyed to the development area facing the electrostatic latent image carrying member, and the electrostatic latent image on the electrostatic latent image carrying member is developed with the developer to form a toner image. Such a developer carrying member is the above-described developer carrying member according to the present invention.

The developing apparatus according to the present invention can be applied to any of a noncontact-type developing apparatus and a contact-type developing apparatus using a magnetic one-component developer or a nonmagnetic one-component and a developing apparatus using a two-component developer. In particular, the developing apparatus of the present invention can be suitably applied to a noncontact-type developing apparatus tending to undergo the occurrence of the variation in the triboelectric charge amount of the developer on the developer carrying member, such as a magnetic one-component noncontact-type developing apparatus or a nonmagnetic one-component noncontact-type developing apparatus.

FIG. 1 is a cross sectional view of a magnetic one-component noncontact-type developing apparatus according to the present invention. The developing apparatus includes a vessel (development vessel 109) for housing a developer, and a developer carrying member 105 for carrying and conveying a magnetic one-component developer (not shown) (magnetic toner) including magnetic toner particles, stored in the vessel. The developer carrying member 105 is provided with a developing sleeve 103 in which a resin layer 101 is formed by coating on a metal cylindrical pipe, which is the substrate 102. Inside the developing sleeve, a magnet (magnet roller) 104 is disposed, so as to magnetically hold the magnetic toner on the surface of the developing sleeve. On the other hand, an electrostatic latent image carrying member (for example, a photosensitive member drum) 106 for carrying electrostatic latent images is rotated in the direction indicated by the arrow B. In the development region D in which the developer carrying member 105 and the photosensitive member drum 106 face each other, the magnetic toner on the developer carrying member 105 is attached to the electrostatic latent images to form the magnetic toner images. A developing method using such a developing apparatus is hereinafter described. The magnetic toner is conveyed into the interior of the development vessel 109 from a developer replenishing vessel (not shown) by way of a developer feeding member (for example, a screw) 115. The development vessel 109 is partitioned into a first section 112 and a second section 111; the magnetic toner conveyed into the first section 112 is made to pass through the space formed by the development vessel 109 and a partitioning member 113 and is transferred into the second section 111 by a stirring-conveying member 110. Inside the second section 111, a stirring member 114 is provided so as to suppress the piling up of the magnetic toner. A magnetic blade 107, which is the developer thickness controlling member, is attached to the development vessel so as to face the developer carrying member 105 with a space of about 50 µm or more and 500 µm or less. The lines of magnetic force from the magnetic pole N1 of the magnet roller 104 are concentrated toward the magnetic blade, the developer carrying member is rotated in the direction indicated by the arrow A, and thus a thin layer of the magnetic toner is formed on the developer carrying member 105. A nonmagnetic developer thickness controlling member may also be used in place of the magnetic blade 107. The magnetic toner acquires the triboelectrically produced charge capable of developing the electrostatic latent image on the photosensitive member drum 106 due to the friction between the magnetic toner particles and the friction between the magnetic toner and the resin layer 101 on the surface of the developer carrying member 105. The thickness of the magnetic toner layer formed on the developer carrying member 105 is preferably further thinner than the minimum space, in the development region D, between the developer carrying member 105 and the photosensitive member drum 106. For the purpose of allowing the magnetic toner carried by the developer carrying member 105 to fly to the electrostatic latent image on the photosensitive member drum to develop the electrostatic latent image, it is preferable to apply a development bias voltage from a development bias power source 108 to the developer carrying member 105. When a direct current voltage is used as the development bias voltage to be applied to the developer carrying member 105, preferable is the voltage corresponding to the intermediate value between the electric potential of the electrostatic latent image and the electric potential of the background portion. For the purpose of increasing the density of the developed image and improving the gradation of the developed image, an alternating bias voltage may be applied to the developer carrying member 105 to form in the development region D an oscillating electric field having an alternately reversing sense of the electric field. Also, in such a case, as the voltage to be applied to the developer carrying member 105, preferable is an alternating bias electric voltage on which superposed is the direct current voltage component corresponding to the intermediate value between the electric potential of the electrostatic latent image and the electric potential of the background portion. In this connection, in the case of the regular development in which the magnetic toner is attached to an electrostatic latent image having a high electric potential, used is a magnetic one-component developer triboelectrically charged in a polarity reverse to the polarity of the electrostatic latent image; in the case of the inverse development in which the magnetic toner is attached to an electrostatic latent image having a low electric potential, used is a magnetic one-component developer triboelectrically charged in the same polarity as the polarity of the electrostatic latent image. The high electric potential and the low electric potential as referred to herein are expressed in terms of the absolute values.

Figure 2:
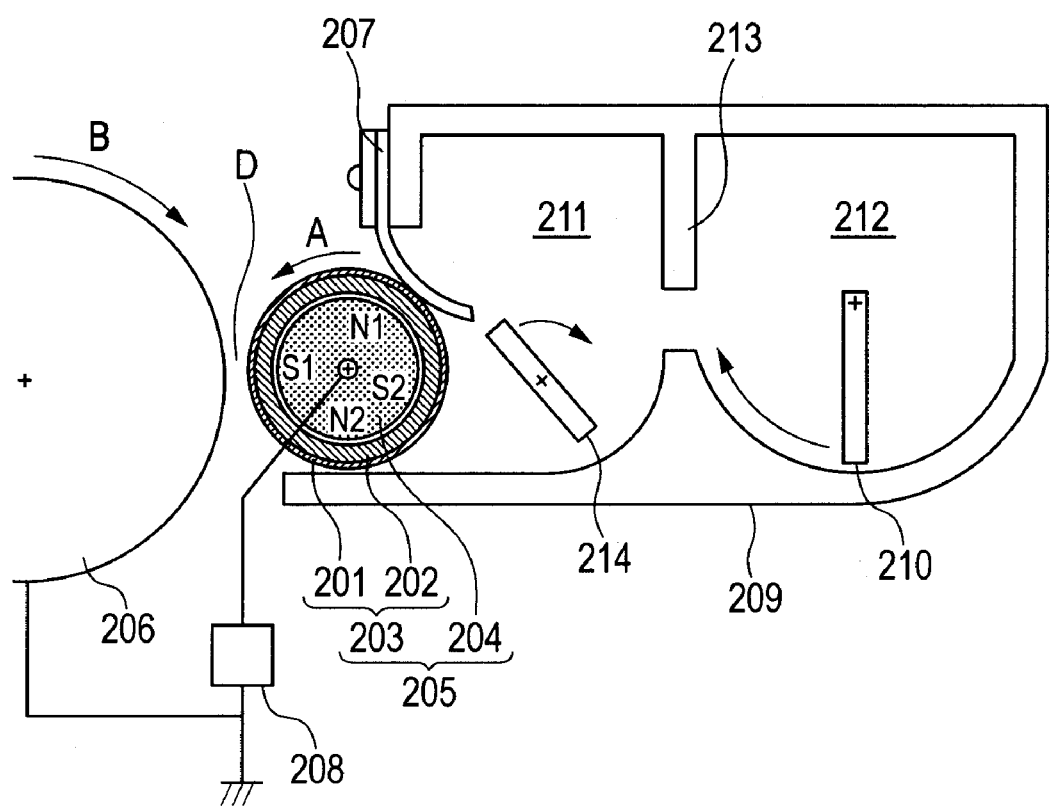
FIG. 2 is a cross sectional view illustrating another embodiment of the developing apparatus according to the present invention.

FIG. 2 is a cross sectional view of another magnetic one-component noncontact-type developing apparatus according to the present invention. The developing apparatus includes a vessel (development vessel 209) for housing a developer, and a developer carrying member 205 for carrying and conveying a magnetic one-component developer (not shown) (magnetic toner) including magnetic toner particles, stored in the vessel. The developer carrying member 205 is provided with a developing sleeve 203 in which a resin layer 201 is formed by coating on a metal cylindrical pipe, which is the substrate 202. Inside the developing sleeve, a magnet (magnet roller) 204 is disposed, so as to magnetically hold the magnetic toner on the surface of the developing sleeve. On the other hand, an electrostatic latent image carrying photosensitive member drum 206 for carrying electrostatic latent images is rotated in the direction indicated by the arrow B. In the development region D in which the developer carrying member 205 and the photosensitive member drum 206 face each other, the magnetic toner on the developer carrying member 205 is attached to the electrostatic latent images to form the magnetic toner images. A developing method using such a developing apparatus is hereinafter described. The development vessel 209 is partitioned into a first section 212 and a second section 211; the magnetic toner filled in the first section 212 is made to pass through the space formed by the development vessel 209 and a partitioning member 213 and is transferred into the second section 211 by a stirring-conveying member 210. Inside the second section 211, a stirring member 214 is provided so as to suppress the piling up of the magnetic toner. An elastic blade 207 having an elastic plate made of a rubber such as urethane rubber or silicone rubber or made of a metal such as phosphor bronze or a stainless steel is attached to the development vessel. The elastic blade 207 is brought into contact with or pressed against the developer carrying member 205 through the intermediary of the toner; as compared to the noncontact type developing apparatus shown in FIG. 1, the toner is more strongly regulated so as to form a thin toner layer on the developer carrying member 205. In this type of developing apparatus, the toner tends to be affected by the nonuniformity of the electroconductivity of the surface of the developer carrying member, the triboelectric charge amount of the toner layer on the developer carrying member tends to undergo variation, and the distribution of the triboelectric charge amount tends to be broad. However, even in such a developing apparatus as described above, the electroconductivity of the surface of the developer carrying member is made uniform by using the developer carrying member of the present invention, and hence the distribution of the triboelectric charge amount of the toner can be made sharp. Here, the abutting pressure of the elastic blade 207 against the developer carrying member 205 is preferably 4.9 N/m or more and 49 N/m or less in terms of linear pressure from the viewpoint that the regulation of the toner can be stabilized and the thickness of the toner layer can be suitably regulated. When the abutting pressure of the elastic blade 207 is set at 4.9 N/m or more in terms of linear pressure, the thickness of the toner layer formed on the developer carrying member can be controlled to a high accuracy and the occurrence of fog and toner leakage in the obtained images can be suppressed. When the contact pressure is set at 49 N/m or less in terms of linear pressure, the rubbing force of the toner is of an appropriate magnitude, and the degradation of the toner and the fusion bonding of the toner to the developer carrying member 205 and the elastic blade 207 can be prevented. For the purpose of allowing the magnetic toner carried by the developer carrying member 205 to fly to the electrostatic latent image on the photosensitive member drum to develop the electrostatic latent image, it is preferable to apply a development bias voltage from a development bias power source 208 to the developer carrying member 205. Although the above-described example is of a magnetic one-component noncontact type, the developing apparatus of the present invention can also be applied to a magnetic one-component contact-type developing apparatus in which the toner layer is formed on the developer carrying member in a thickness equal to or larger than the spatial distance in the development region D between the developer carrying member and the photosensitive drum.

Figure 3:
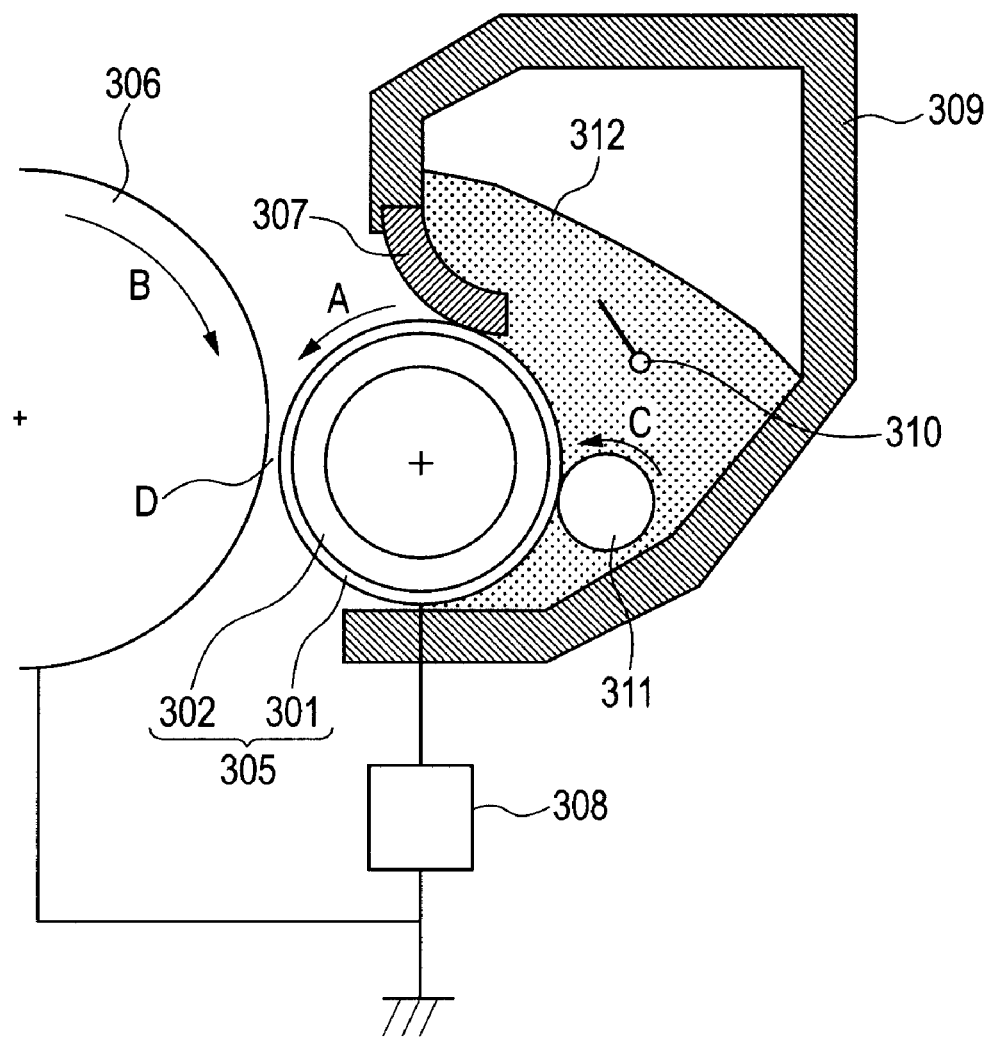
FIG. 3 is a cross sectional view illustrating yet another embodiment of the developing apparatus according to the present invention.

FIG. 3 is a cross sectional view of a nonmagnetic one-component noncontact-type developing apparatus, using a nonmagnetic toner, according to the present invention. A photosensitive member drum 306 carrying electrostatic latent images is rotated in the direction indicated by the arrow B. A developer carrying member 305 is constituted with a substrate (a metal cylindrical pipe) 302 and the resin layer 301 formed on the surface of the substrate 302. A columnar member can also be used as the substrate in place of the metal cylindrical pipe; a nonmagnetic one-component developer (a nonmagnetic toner) is used, and hence no magnet is provided inside the substrate 302. A developing method in such a developing apparatus is hereinafter described. A stirring-conveying member 310 for stirring and conveying a nonmagnetic one-component developer 312 (a nonmagnetic toner) is provided inside the development vessel 309. A developer feeding and peeling member (RS roller) 311 for feeding a nonmagnetic toner 312 to the developer carrying member 305 and peeling the nonmagnetic toner 312 remaining after development on the surface of the developer carrying member 305 is provided in the development vessel so as to abut against the developer carrying member 305. By rotating the RS roller 311 in the same direction or the reverse direction with respect to the rotation of the developer carrying member 305, the nonmagnetic toner 312 remaining on the developer carrying member 305 is peeled off and the fresh nonmagnetic toner 312 is fed inside the development vessel 309. The developer carrying member 305 carries the fed nonmagnetic toner 312, and is rotated in the direction indicated by the arrow A to convey the nonmagnetic toner 312 into the development region D in which the developer carrying member 305 and the photosensitive member drum 306 face each other. The nonmagnetic toner carried on the developer carrying member 305 is pressed against the surface of the developer carrying member 305 by a developer thickness controlling member 307 and the nonmagnetic toner layer is formed so as to have a constant thickness. The nonmagnetic toner is imparted a triboelectric charge sufficient to develop the electrostatic latent images on the photosensitive member drum 306 by the friction between the nonmagnetic toner particles, the friction between the nonmagnetic toner and the developer carrying member 305 and the friction between the nonmagnetic toner and the developer thickness controlling member 307. The thickness of the nonmagnetic toner layer formed on the developer carrying member 305 may be thinner than the minimum space, in the development region, between the developer carrying member 305 and the photosensitive member drum 306. For the purpose of allowing the nonmagnetic toner 312 carried by the developer carrying member 305 to fly to the electrostatic latent image on the photosensitive member drum 306 to develop the electrostatic latent image, it is possible to apply a development bias voltage from a development bias power source 308 to the developer carrying member 305. The development bias voltage may be a direct current voltage or an alternating bias voltage, and the voltage thereof is preferably set in the same manner as described above. In the development vessel of the above-described developing apparatus, the RS roller 311 is preferably an elastic roller made of, for example, a resin, a rubber or a sponge. A belt member or a brush member may also be used in place of the RS roller 311 as the case may be. The elastic blade 307 is preferably the same in material and has the same curved shape as in the elastic blade 207 in the magnetic one-component noncontact-type developing apparatus shown in FIG. 2, and is preferably disposed so as to be pressed against the developer carrying member 305. The abutting of the elastic blade 307 against the developer carrying member 305 is preferably due to the same abutting force as in the case of the abutting of the elastic blade 207 against the developer carrying member 205 in the magnetic one-component noncontact type shown in FIG. 2, from the same reasons. Although the above-described example is of a nonmagnetic one-component noncontact type, the above-described example can also be suitably applied to a nonmagnetic one-component contact-type developing apparatus in which the nonmagnetic one-component developer layer is formed on the developer carrying member in a thickness equal to or larger than the spatial distance in the development region D between the developer carrying member and the photosensitive member drum.

[Developer]

The developer (toner) according to the present invention includes in a binder resin a colorant, a charge controlling agent, a release agent, inorganic particles and the like. The developer may be a magnetic toner in which a magnetic material is essential or a nonmagnetic toner in which no magnetic material is included. The mass average particle size is preferably in a range of 4 μm or more and 10 μm or less. This is because a satisfactory balance is established between the triboelectric charge amount or the image quality and the image density. When the mass average particle size of the toner is 10 μm or less, the degradation of the reproducibility of the fine dot image can be suppressed. On the other hand, when the mass average particle size of the toner is 4 μm or more, the occurrence of fog and the occurrence of low image density due to the triboelectric charging failure can be suppressed. As the binder resin of the toner, a vinyl resin, a polyester resin, a polyurethane resin, an epoxy resin and a phenolic resin can be used. Among these resins, preferable are the vinyl resin and the polyester resin. For the purpose of improving the triboelectric charging property, the charge controlling agent can be include in the toner particles (internal addition), or the charge controlling agent can be used as mixed with the toner particles (external addition). The charge controlling agent facilitates the control of the optimal charge amount according to the involved development system.

When the toner of the present invention is applied to the one-component developing apparatus, the improvement effect of the charge imparting capability of the developer carrying member of the present invention is easily obtained by using the above-described toner in which the charge amount is controlled as a negatively chargeable developer.

In the following Examples, the proportions given in parts or % are all given in parts by mass or % by mass, unless otherwise specified.

[Measurement Methods of Physical Properties]

First, the measurement methods of the physical properties in the present invention are described.

(1) Analysis Method of Acrylic Resin

The structure of the polymer of the acrylic resin was determined by analyzing the sample prepared by scraping the resin layer of the developer carrying member with a thermolysis GC/MS apparatus, Voyager (trade name: manufactured by Thermo Electron Corp.). The analysis was performed under the following conditions: thermolysis temperature: 600° C., column: HP-1 (15 m×0.25 mm×0.25 μm), inlet: temperature 300° C., split: 20.0, injection rate: 1.2 ml/min, temperature program: 50° C. (4 min)-300° C. (20° C./min).

(2) Volume Resistance Value of Resin Layer

On a 100-μm thick PET sheet, a 7-μm to 20-μm thick resin layer was formed, and the volume resistance value of the resin layer was measured with a four-terminal probe by using a resistivity meter, Loresta (trade name, manufactured by Mitsubishi Chemical Corp.). The measurement environment was such that the temperature was 20° C. and the humidity was 50% RH.

(3) Arithmetic Mean Roughness Ra of Developer Carrying Member Surface

The arithmetic mean roughness Ra of the developer carrying member surface was measured on the basis of JIS B0601 (2001) with a surface roughness meter, Surfcorder SE-3500 (trade name, manufactured by Kosaka Laboratory Ltd.). The measurement conditions were such that the cutoff was 0.8 mm, the evaluation length was 4 mm and the feeding speed was 0.5 mm/s. The measurement was performed for nine points, namely, three points in the axial direction×three points in the peripheral direction. The average value of these measured values was taken as the arithmetic mean roughness Ra of the developer carrying member surface of the concerned sample.

(4) Volume Average Particle Size of Unevenness-Imparting Particles

As the measurement apparatus of the volume average particle size of the unevenness-imparting particles, a laser diffraction particle size distribution analyzer, a Coulter LS-230 particle size analyzer (trade name, manufactured by Beckman Coulter, Inc.) was used. For the measurement, a small volume module was used, and isopropyl alcohol (IPA) was used as the solvent. First, the interior of the measurement system of the measurement apparatus was cleaned with IPA for about 5 minutes, and after the cleaning the background function was performed. Next, about 10 mg of a measurement sample was added to 50 ml of IPA. A solution in which the sample had been suspended was subjected to a dispersion treatment for about 2 minutes with an ultrasonic disperser to prepare a sample solution. Then, the sample solution was gradually added into the measurement system of the measurement apparatus, and the sample concentration in the measurement system was adjusted so as for the PIDS (Polarization Intensity Differential Scattering) concentration to be 45% to 55%. Then, the measurement was performed and the volume average particle size was determined as derived from the volume distribution.

(5) Thickness of Resin Layer

For the measurement of the thickness of the resin layer, a laser sizer for measuring the outer diameter of a cylinder (a controller: LS-5500 (trade name, manufactured by Keyence Corp.) and a sensor head: LS-5040T (trade name, manufactured by Keyence Corp.) was used. A sensor section was additionally fixed to the apparatus equipped with a jig for securing the developer carrying member and a mechanism for feeding the developer carrying member, and the outer diameter size was measured. The measurement was performed as follows: the developer carrying member was divided into divisions in the lengthwise direction, and the 30 divisions were subjected to the measurement; then the developer carrying member was rotated by 90° in the circumferential direction and similarly the 30 divisions were subjected to the measurement; thus, in total, 60 measurements were performed. The average value of the thus obtained measured values was taken as the outer diameter size of the concerned sample. The outer diameter of the substrate was measured before the formation of the resin layer, the outer diameter was again measured after the formation of the resin layer, and the difference between these two diameters was taken as the thickness of the resin layer.

(6) Mass Average Particle Size D4 of Developer (Magnetic Toner)

The measurement was performed with a particle size analyzer, Coulter Multisizer III (trade name: manufactured by Beckman Coulter, Inc.). As an electrolyte solution, an about 1% NaCl aqueous solution prepared by using first-grade sodium chloride was used. In about 100 ml of the electrolyte solution, about 0.5 ml of an alkylbenzenesulfonate was added as a dispersant, and further about 5 mg of a measurement sample was added and suspended. The electrolyte solution in which the sample had been suspended was subjected to a dispersion treatment for about 1 minute with an ultrasonic disperser, and was subjected to a measurement of the volumes and numbers of the measurement sample particles, by using the above-described measurement apparatus with the 100-μm aperture, to derive the volume distribution and the number distribution. From the results thus obtained, the mass average particle size (D4), on the basis of the mass, determined from the volume distribution was obtained.

<Acrylic Resin>

<<Production Example A-1 of Acrylic Resin Solution A-1>>

In a four-mouth separable flask equipped with a stirrer, a condenser, a thermometer, a nitrogen introduction tube and a dropping funnel, the following materials were mixed and stirred until the system became uniform.

Dimethylaminoethyl methacrylate (tertiary amino group-containing monomer): 31.0 parts by mass
Lauryl bromide (quaternarizing agent): 49.1 parts by mass
Isopropyl alcohol: 50 parts by mass While the above-described material were being stirred, the temperature was increased to a temperature of 70° C. and then stirring was continued for 5 hours to quaternarize the tertiary amino group-containing monomer, and thus (2-methacryloyloxyethyl) lauryldimethylammonium bromide, which is a quaternary ammonium base-containing acrylic monomer, was obtained. The obtained reaction solution was cooled, and then 19.9 parts by mass of N-methylolacrylamide was fed as a copolymerizing component to the reaction system and the reaction system was stirred until the system became uniform. Then, while the stirring was being continued, the reaction system was heated until the temperature in the reaction system reached 70° C. To this reaction system, a polymerization initiator solution prepared by dissolving 1.0 part by mass of azobisisobutyronitrile (AIBN) as a polymerization initiator in 50 parts by mass of isopropyl alcohol was dropwise added from the dropping funnel over 1 hour. After the completion of the dropwise addition, the reaction system was allowed to react further for 5 hours under reflux condition with introduction of nitrogen, then 0.2 part by mass of AIBN was added and then the reaction system was allowed to react for 1 hour to terminate the polymerization reaction. To this solution, 0.1 part by mass of p-toluenesulfonic acid was added, and the solution was diluted with isopropyl alcohol to yield the acrylic resin solution A-1 with a solid content of 40%. The obtained acrylic resin solution was dried by heating at 150° C. for 30 minutes, and then the acrylic resin was analyzed; consequently, the acrylic resin was found to be a copolymer composed of the unit represented by formula (10), the unit represented by formula (11) and the unit represented by formula (12). In the analysis of the acrylic resin, from the MS spectrum peak of m/z=184, it was verified that binding occurred between the position indicated by the symbol * in formula (10) and the position indicated by the symbol ** in formula (12).

(10)

(11)

(12)

<<Production Examples of Acrylic Resin Solutions A-2 to A-29 and a-30 to a-33>>

The acrylic resin solutions A-2 to A-29 and a-30 to a-33 were obtained in the same manner as in the production example A-1 except that the copolymerization components used were altered to the components shown in Table 1. The acrylic resin solutions A-4, A-15, A-17, A-25 and A-29 were subjected to the exchange of the anions, after the completion of the polymerization reaction, from the bromide ion to the toluene sulfonic acid ion or methanesulfonic acid ion. The structures of the acrylic resins after drying by heating are shown in Table 2.

TABLE 1

| Acrylic resin solution | Hydroxyl group-modified acrylic monomer | | Quaternary ammonium base-containing acrylic monomer | | | | Other acrylic monomer | |
|---|---|---|---|---|---|---|---|---|
| | | | Tertiary amino group-containing monomer | | Quaternarizing agent | | | |
| | Type | parts by mass | Type | parts by mass | Type | parts by mass | Type | parts by mass |
| A-1 | MAA | 19.9 | DMM | 31.0 | Lauryl bromide | 49.1 | — | — |
| A-2 | MAA | 9.63 | DMM | 34.9 | Lauryl bromide | 55.4 | — | — |
| A-3 | MAA | 36.7 | DMM | 24.5 | Lauryl bromide | 38.8 | — | — |
| A-4 | MAA | 19.9 | DMM | 31.0 | Lauryl bromide | 49.1 | — | — |
| A-5 | EAA | 22.1 | DMM | 30.1 | Lauryl bromide | 47.8 | — | — |
| A-6 | MAA | 20.5 | DMA | 29.0 | Lauryl bromide | 50.5 | — | — |

TABLE 1-continued

| Acrylic resin solution | Hydroxyl group-modified acrylic monomer | | Quaternary ammonium base-containing acrylic monomer | | | | Other acrylic monomer | |
|---|---|---|---|---|---|---|---|---|
| | | | Tertiary amino group-containing monomer | | Quaternarizing agent | | | |
| | Type | parts by mass | Type | parts by mass | Type | parts by mass | Type | parts by mass |
| A-7  | MAA | 22.7  | DMM | 35.3 | Methyl p-toluenesulfonate | 41.9 | — | — |
| A-8  | MAA | 25.6  | DMM | 39.7 | Butyl bromide | 34.7 | — | — |
| A-9  | MAA | 22.4  | DMM | 34.8 | Octyl bromide | 42.8 | — | — |
| A-10 | MAA | 15.6  | DOM | 54.6 | Octyl bromide | 29.8 | — | — |
| A-11 | MAA | 17.1  | DMM | 26.6 | Stearyl bromide | 56.3 | — | — |
| A-12 | EAA | 27.3  | DMM | 37.3 | Octylchloride | 35.3 | — | — |
| A-13 | MAA | 12.8  | DMM | 46.5 | Butyl bromide | 40.6 | — | — |
| A-14 | MAA | 11.2  | DMM | 40.6 | Methyl p-toluenesulfonate | 48.2 | — | — |
| A-15 | MAA | 36.7  | DMM | 24.5 | Lauryl bromide | 38.8 | — | — |
| A-16 | MAA | 7.35  | DOM | 59.9 | Octyl bromide | 32.8 | — | — |
| A-17 | MAA | 36.7  | DMM | 24.5 | Lauryl bromide | 38.8 | — | — |
| A-18 | MAA | 19.0  | DMA | 26.9 | Stearyl chloride | 54.2 | — | — |
| A-19 | MAA | 26.3  | DMM | 24.5 | Lauryl bromide | 38.8 | Methyl methacrylate | 10.4 |
| A-20 | MAA | 25.2  | DMM | 23.5 | Lauryl bromide | 37.2 | n-Butyl methacrylate | 14.2 |
| A-21 | MAA | 23.8  | DMM | 22.2 | Lauryl bromide | 35.3 | Octyl methacrylate | 18.7 |
| A-22 | MAA | 22.6  | DMM | 21.1 | Lauryl bromide | 33.5 | Lauryl methacrylate | 22.8 |
| A-23 | MAA | 13.1  | DMM | 20.4 | Lauryl bromide | 32.3 | Octyl methacrylate | 34.2 |
| A-24 | MAA | 11.1  | DMM | 28.8 | Lauryl bromide | 45.6 | Octyl methacrylate | 14.5 |
| A-25 | EAA | 30.1  | DMM | 24.7 | Octyl bromide | 30.3 | n-Butyl methacrylate | 14.9 |
| A-26 | MAA | 12.0  | DMM | 31.0 | Lauryl bromide | 49.2 | Methyl methacrylate | 7.90 |
| A-27 | MAA | 31.0  | DMA | 26.3 | Butyl bromide | 25.2 | n-Butyl methacrylate | 17.4 |
| A-28 | MAA | 11.9  | DMM | 18.6 | Lauryl bromide | 29.4 | Lauryl methacrylate | 40.0 |
| A-29 | MAA | 23.8  | DMM | 22.2 | Lauryl bromide | 35.3 | Octyl methacrylate | 18.7 |
| a-30 | MAA | 15.6  | DMM | 24.3 | Docosyl bromide | 60.1 | — | — |
| a-31 | —   | —     | DMM | 31.9 | Lauryl bromide | 50.6 | Methyl acrylate | 17.5 |
| a-32 | MAA | 50.2  | —   | —    | —              | —    | Methyl methacrylate | 49.8 |
| a-33 | —   | —     | —   | —    | —              | —    | Methyl methacrylate | 100 |

MAA: N-Methylolacrylamide
EAA: N-Ethylolacrylamide
DMM: Dimethylaminoethyl methacrylate
DMA: Dimethylaminoethyl acrylate
DOM: Dioctylaminoethyl methacrylate
Note:
A-4, A-15, A-17, A-25 and A-29 were subjected to ion exchange.

TABLE 2

| Acrylic resin solution | Unit (1) (3) | | | Unit (2) | | | | | Unit (7) | |
|---|---|---|---|---|---|---|---|---|---|---|
| | R2 R9 | | Unit ratio a | R5 | R6 | R7 | Anion species | Unit ratio b | R20 | Unit ratio c |
| A-1  | CH2  | | 0.5 | CH3   | CH3   | C12H25 | Br | 0.5 | — | — |
| A-2  | CH2  | | 0.3 | CH3   | CH3   | C12H25 | Br | 0.7 | — | — |
| A-3  | CH2  | | 0.7 | CH3   | CH3   | C12H25 | Br | 0.3 | — | — |
| A-4  | CH2  | | 0.5 | CH3   | CH3   | C12H25 | p-Toluenesulfonic acid | 0.5 | — | — |
| A-5  | C2H4 | | 0.5 | CH3   | CH3   | C12H25 | Br | 0.5 | — | — |
| A-6  | CH2  | | 0.5 | CH3   | CH3   | C12H25 | Br | 0.5 | — | — |
| A-7  | CH2  | | 0.5 | CH3   | CH3   | CH3    | p-Toluenesulfonic acid | 0.5 | — | — |
| A-8  | CH2  | | 0.5 | CH3   | CH3   | C4H9   | Br | 0.5 | — | — |
| A-9  | CH2  | | 0.5 | CH3   | CH3   | C8H17  | Br | 0.5 | — | — |
| A-10 | CH2  | | 0.5 | C8H17 | C8H17 | C8H17  | Br | 0.5 | — | — |
| A-11 | CH2  | | 0.5 | CH3   | CH3   | C18H37 | Br | 0.5 | — | — |
| A-12 | C2H4 | | 0.5 | CH3   | CH3   | C8H17  | Cl | 0.5 | — | — |
| A-13 | CH2  | | 0.3 | CH3   | CH3   | C4H9   | Br | 0.7 | — | — |
| A-14 | CH2  | | 0.3 | CH3   | CH3   | CH3    | p-Toluenesulfonic acid | 0.7 | — | — |
| A-15 | CH2  | | 0.7 | CH3   | CH3   | C12H25 | p-Toluenesulfonic acid | 0.3 | — | — |
| A-16 | CH2  | | 0.3 | C8H17 | C8H17 | C8H17  | Br | 0.7 | — | — |
| A-17 | CH2  | | 0.7 | CH3   | CH3   | C12H25 | CH3SO3 | 0.3 | — | — |
| A-18 | CH2  | | 0.5 | CH3   | CH3   | C18H37 | Cl | 0.5 | — | — |
| A-19 | CH2  | | 0.5 | CH3   | CH3   | C12H25 | Br | 0.3 | CH3 | 0.2 |
| A-20 | CH2  | | 0.5 | CH3   | CH3   | C12H25 | Br | 0.3 | C4H9 | 0.2 |
| A-21 | CH2  | | 0.5 | CH3   | CH3   | C12H25 | Br | 0.3 | C8H17 | 0.2 |
| A-22 | CH2  | | 0.5 | CH3   | CH3   | C12H25 | Br | 0.3 | C12H25 | 0.2 |
| A-23 | CH2  | | 0.3 | CH3   | CH3   | C12H25 | Br | 0.3 | C8H17 | 0.4 |
| A-24 | CH2  | | 0.3 | CH3   | CH3   | C12H25 | Br | 0.5 | C8H17 | 0.2 |
| A-25 | C2H4 | | 0.5 | CH3   | CH3   | C8H17  | CH3SO3 | 0.3 | C4H9 | 0.2 |
| A-26 | CH2  | | 0.3 | CH3   | CH3   | C12H25 | Br | 0.5 | CH3 | 0.2 |
| A-27 | CH2  | | 0.5 | CH3   | CH3   | C4H9   | Br | 0.3 | C4H9 | 0.2 |
| A-28 | CH2  | | 0.3 | CH3   | CH3   | C12H25 | Br | 0.3 | C12H25 | 0.4 |

TABLE 2-continued

| Acrylic resin solution | Unit (1) (3) | | Unit (2) | | | | | Unit (7) | |
|---|---|---|---|---|---|---|---|---|---|
| | R2 R9 | Unit ratio a | R5 | R6 | R7 | Anion species | Unit ratio b | R20 | Unit ratio c |
| A-29 | CH2 | 0.5 | CH3 | CH3 | C12H25 | p-Toluenesulfonic acid | 0.3 | C8H17 | 0.2 |
| a-30 | CH2 | 0.5 | CH3 | CH3 | C22H25 | Br | 0.5 | — | — |
| a-31 | — | — | CH3 | CH3 | C12H25 | Br | 0.5 | CH3 | 0.5 |
| a-32 | CH2 | 0.5 | — | — | — | — | — | CH3 | 0.5 |
| a-33 | — | — | — | — | — | — | — | CH3 | 1 |

Note 1:
The unit ratios a, b and c represent a/(a + b + c), b/(a + b + c) and c/(a + b + c), respectively.

<Other Resins, Electroconductive Particles, Unevenness-Imparting Particles>

As other resins used for the developer carrying member, other than acrylic resin, the electroconductive particles and the unevenness-imparting particles, the materials shown in the following Tables A, B and C were used.

TABLE A

| Other resin | Trade name |
|---|---|
| Phenolic resin | Thermosetting resol-type phenolic resin solution, containing 40% of methanol: "J-325" (trade name, manufactured by Dainippon Ink and Chemicals Inc.) |
| Melamine resin | Thermosetting butylated melamine resin: "L-109-65" (trade name, manufactured by Dainippon Ink and Chemicals Inc.) |
| Silicone resin | Silicone resin: "SR2410" (trade name, manufactured by Dow Corning Toray Silicone Co., Ltd.) |

TABLE B

| Electroconductive particles | Trade name |
|---|---|
| C-1 | Toka Black "#5500" (trade name, manufactured by Tokai Carbon Co., Ltd.) |
| C-2 | Graphite particles: "CSP-E" (trade name, manufactured by Nippon Graphite Industries, Ltd., primary average particle size = 4.5 μm) |

TABLE C

| Unevenness-imparting particles | Trade name |
|---|---|
| D-1 | NICA beads: "ICB-0520" (trade name, manufactured by Nippon Carbon Co., Ltd.) |
| D-2 | NICA beads: "ICB-1020" (trade name, manufactured by Nippon Carbon Co., Ltd.) |

EXAMPLE 1

<Production of Developer Carrying Member E-1>

The developer carrying member E-1 was produced by the following method. First, the following materials were mixed, and the resulting mixture was subjected to a dispersion treatment with a sand mill, Horizontal Ready Mill NVM-03 (trade name, manufactured by Aimex Co., Ltd.) (using glass beads having 1.0 mm in diameter with a filling rate of 85%), and thus a coating liquid was obtained.

Acrylic resin solution A-1: Solid content: 100 parts by mass (250 parts by mass as solution)
Electroconductive particles C-1: 6.7 parts by mass
Electroconductive particles C-2: 60 parts by mass
Unevenness-imparting particles D-2: 10 parts by mass
Isopropyl alcohol: 200 parts by mass An article being the same in shape as the aluminum cylindrical pipe of the developer carrying member incorporated in the genuine cartridge of LASER JET 4350 (trade name, manufactured by Hewlett-Packard Co.) was prepared as the substrate. The both end portions were masked in a width of 6 mm, and the substrate was disposed so as for the axis thereof to be parallel to the vertical direction. While the substrate was being rotated at 1500 rpm and an air spray gun was being moved downward at a rate of 40 mm/sec, the substrate was coated with the coating liquid to form a coating film in such a way that the coating film thickness after curing was 8 Successively, the coating film was heated for 30 minutes in a hot air drying furnace set at a temperature of 150° C. to cure the coating film, and thus the developer carrying member E-1 was obtained.

<Fabrication of Electrophotographic Image Forming Apparatus, and Image Evaluation Using the Same>

A magnet roller was assembled to the obtained developer carrying member E-1, and the developer carrying member E-1 was incorporated into the genuine cartridge of the printer, LASER JET4350 (trade name, manufactured by Hewlett-Packard Co.) to form a developing apparatus. The developing apparatus was mounted in the above-described printer, and the below-described image evaluation was performed. The image evaluation was performed in a high-temperature high-humidity environment (temperature: 32.5° C., humidity: 80% RH, H/H). For the image evaluation, a letter-sized paper, Business 4200 (trade name, manufactured by Xerox Corp., 75 g/m$^2$) was used, and an image print-out test was performed in which a continuous copying of the character image of a 3% coverage rate was performed on 50,000 sheets of A4 sized ordinary paper by longitudinal feed (A4 portrait). The results thus obtained are shown in Table 4. The image evaluations (1) to (3) were each performed at the initial stage and after the 50,000 sheet image print-out.

(1) Image Density

A reflection densitometer, RD918 (trade name, manufactured by MacBeth Co., Ltd.) was used, and the density of the solid black area obtained by printing of a solid image was measured at five different points and the arithmetic mean of these values was taken as the image density. The image density decrease rate after the 50,000 sheet image print-out in relation to the initial stage image density was derived.

(2) Density Unevenness

A halftone image and a solid black image were printed out, and the linear density difference and the belt-like density difference running in the image traveling direction were evaluated on the basis of the following standards. The density unevenness was ranked for evaluation on the basis of the following standards.

A: No density difference can be identified both on the image and in the sleeve.
B: A slight density difference can be identified on the halftone image, but no density difference can be identified on the solid black image.
C: A slight density difference can be identified on the solid black image, but belts having visually discernible density differences can be identified on the halftone image.
D: Density difference definitely measurable with a reflection densitometer occurs in belt shapes on the halftone image, and density difference can be visually identified even on the solid black image.

(3) Image Quality Evaluation

Figure 4:
FIG. 4 is an image of a Chinese character used for the image quality evaluation of the developing apparatuses according to the present invention.

The image of the Chinese character shown in FIG. 4, having a 4-point font size, was printed out, and the toner scattering in the area surrounding the concerned image and the blurring of the concerned image were visually observed, and the image quality was evaluated on the basis of the following standards.

A: The image is clear and free from toner scattering even by observation with a loupe having a magnification of 10.
B: The image is clear as far as the image is visually observed.
C: Somewhat toner scattering is observed, but practically there is no problem.
D: Toner scattering is conspicuous and blurring of the character image can be identified.

EXAMPLES 2 TO 31 AND COMPARATIVE EXAMPLES 1 TO 4

<Production of the Developer Carrying Members E-2 to E-31 and F-32 to F-35>

The developer carrying members E-2 to E-31 and F-32 to F-35 were prepared in the same manner as in Example 1 except that the coating liquids shown in Table 3 were respectively used.

<Fabrication of Electrophotographic Image Forming Apparatus, and Image Evaluation using the Same>

The obtained developer carrying members E-2 to E-31 and F- to F-35 were each incorporated into the cartridge to obtain a developing apparatus. The resulting developing apparatuses were each mounted in the printer in the same manner as in Example 1, and the image evaluations were performed in the same manner as in Example 1. The results thus obtained are shown in Table 4

TABLE 3

| Developer carrying member | Acrylic resin Type | parts by mass (solid content) | Other resin Type | parts by mass (solid content) | Electroconductive particles 1 Type | parts by mass | Electroconductive particles 2 Type | parts by mass | Unevenness-imparting particles Type | parts by mass |
|---|---|---|---|---|---|---|---|---|---|---|
| E-1 | A-1 | 100 | None | — | C-1 | 6.7 | C-2 | 60 | D-2 | 10 |
| E-2 | A-2 | 100 | None | — | C-1 | 6.7 | C-2 | 60 | D-2 | 10 |
| E-3 | A-3 | 100 | None | — | C-1 | 6.7 | C-2 | 60 | D-2 | 10 |
| E-4 | A-4 | 100 | None | — | C-1 | 6.7 | C-2 | 60 | D-2 | 10 |
| E-5 | A-5 | 100 | None | — | C-1 | 6.7 | C-2 | 60 | D-2 | 10 |
| E-6 | A-6 | 100 | None | — | C-1 | 6.7 | C-2 | 60 | D-2 | 10 |
| E-7 | A-7 | 100 | None | — | C-1 | 6.7 | C-2 | 60 | D-2 | 10 |
| E-8 | A-8 | 100 | None | — | C-1 | 6.7 | C-2 | 60 | D-2 | 10 |
| E-9 | A-9 | 100 | None | — | C-1 | 6.7 | C-2 | 60 | D-2 | 10 |
| E-10 | A-10 | 100 | None | — | C-1 | 6.7 | C-2 | 60 | D-2 | 10 |
| E-11 | A-11 | 100 | None | — | C-1 | 6.7 | C-2 | 60 | D-2 | 10 |
| E-12 | A-12 | 100 | None | — | C-1 | 6.7 | C-2 | 60 | D-2 | 10 |
| E-13 | A-13 | 100 | None | — | C-1 | 6.7 | C-2 | 60 | D-2 | 10 |
| E-14 | A-14 | 100 | None | — | C-1 | 6.7 | C-2 | 60 | D-2 | 10 |
| E-15 | A-15 | 100 | None | — | C-1 | 6.7 | C-2 | 60 | D-2 | 10 |
| E-16 | A-16 | 100 | None | — | C-1 | 6.7 | C-2 | 60 | D-2 | 10 |
| E-17 | A-17 | 100 | None | — | C-1 | 6.7 | C-2 | 60 | D-2 | 10 |
| E-18 | A-18 | 100 | None | — | C-1 | 6.7 | C-2 | 60 | D-2 | 10 |
| E-19 | A-19 | 100 | None | — | C-1 | 6.7 | C-2 | 60 | D-2 | 10 |
| E-20 | A-20 | 100 | None | — | C-1 | 6.7 | C-2 | 60 | D-2 | 10 |
| E-21 | A-21 | 100 | None | — | C-1 | 6.7 | C-2 | 60 | D-2 | 10 |
| E-22 | A-22 | 100 | None | — | C-1 | 6.7 | C-2 | 60 | D-2 | 10 |
| E-23 | A-23 | 100 | None | — | C-1 | 6.7 | C-2 | 60 | D-2 | 10 |
| E-24 | A-24 | 100 | None | — | C-1 | 6.7 | C-2 | 60 | D-2 | 10 |
| E-25 | A-25 | 100 | None | — | C-1 | 6.7 | C-2 | 60 | D-2 | 10 |
| E-26 | A-26 | 100 | None | — | C-1 | 6.7 | C-2 | 60 | D-2 | 10 |
| E-27 | A-27 | 100 | None | — | C-1 | 6.7 | C-2 | 60 | D-2 | 10 |
| E-28 | A-28 | 100 | None | — | C-1 | 6.7 | C-2 | 60 | D-2 | 10 |
| E-29 | A-29 | 100 | None | — | C-1 | 6.7 | C-2 | 60 | D-2 | 10 |
| E-30 | A-1 | 50 | Phenolic | 50 | C-1 | 6.7 | C-2 | 60 | D-2 | 10 |
| E-31 | A-1 | 10 | Phenolic | 90 | C-1 | 6.7 | C-2 | 60 | D-2 | 10 |
| F-32 | a-31 | 100 | None | — | C-1 | 6.7 | C-2 | 60 | D-2 | 10 |
| F-33 | a-32 | 100 | None | — | C-1 | 6.7 | C-2 | 60 | D-2 | 10 |
| F-34 | a-33 | 100 | None | — | C-1 | 6.7 | C-2 | 60 | D-2 | 10 |
| F-35 | a-30 | 100 | None | — | C-1 | 6.7 | C-2 | 60 | D-2 | 10 |

TABLE 4

| | Developer carrying member | Image density | | | Density decrease rate (%) | | Image quality evaluation | |
|---|---|---|---|---|---|---|---|---|
| | | Initial stage | After 50,000-sheet printing | Density decrease rate (%) | Initial stage | After 50,000-sheet printing | Initial stage | After 50,000-sheet printing |
| Example 1 | E-1 | 1.41 | 1.36 | 3.5 | A | A | A | A |
| Example 2 | E-2 | 1.43 | 1.35 | 5.6 | A | A | A | A |
| Example 3 | E-3 | 1.39 | 1.35 | 2.9 | A | A | A | A |
| Example 4 | E-4 | 1.43 | 1.37 | 4.2 | A | A | A | A |
| Example 5 | E-5 | 1.41 | 1.34 | 5.0 | A | A | A | A |
| Example 6 | E-6 | 1.42 | 1.37 | 3.5 | A | A | A | A |
| Example 7 | E-7 | 1.34 | 1.30 | 3.0 | A | A | B | B |
| Example 8 | E-8 | 1.35 | 1.30 | 3.7 | A | A | B | B |
| Example 9 | E-9 | 1.39 | 1.36 | 2.2 | A | A | A | A |
| Example 10 | E-10 | 1.41 | 1.34 | 5.0 | A | A | A | A |
| Example 11 | E-11 | 1.43 | 1.36 | 4.9 | A | B | A | A |
| Example 12 | E-12 | 1.40 | 1.35 | 3.6 | A | A | A | A |
| Example 13 | E-13 | 1.37 | 1.31 | 4.4 | A | A | B | B |
| Example 14 | E-14 | 1.36 | 1.30 | 4.4 | A | A | B | B |
| Example 15 | E-15 | 1.40 | 1.36 | 2.9 | A | A | A | A |
| Example 16 | E-16 | 1.43 | 1.33 | 7.0 | A | B | A | A |
| Example 17 | E-17 | 1.41 | 1.36 | 3.5 | A | A | A | A |
| Example 18 | E-18 | 1.43 | 1.37 | 4.2 | A | B | A | A |
| Example 19 | E-19 | 1.37 | 1.31 | 4.4 | A | B | A | B |
| Example 20 | E-20 | 1.39 | 1.33 | 4.3 | A | A | A | B |
| Example 21 | E-21 | 1.39 | 1.32 | 5.0 | A | A | A | A |
| Example 22 | E-22 | 1.40 | 1.32 | 5.7 | A | A | A | A |
| Example 23 | E-23 | 1.38 | 1.30 | 5.8 | A | A | A | B |
| Example 24 | E-24 | 1.42 | 1.32 | 7.0 | A | A | A | B |
| Example 25 | E-25 | 1.38 | 1.32 | 4.3 | A | A | A | B |
| Example 26 | E-26 | 1.40 | 1.30 | 7.1 | A | B | A | B |
| Example 27 | E-27 | 1.34 | 1.30 | 3.0 | A | A | B | B |
| Example 28 | E-28 | 1.40 | 1.30 | 7.1 | A | A | A | B |
| Example 29 | E-29 | 1.41 | 1.35 | 4.3 | A | A | A | A |
| Example 30 | E-30 | 1.39 | 1.36 | 2.2 | A | A | A | A |
| Example 31 | E-31 | 1.37 | 1.35 | 1.5 | A | A | A | B |
| Comparative Example 1 | F-32 | 1.42 | 1.21 | 14.8 | A | C | A | D |
| Comparative Example 2 | F-33 | 1.30 | 1.22 | 6.2 | C | C | C | D |
| Comparative Example 3 | F-34 | 1.31 | 1.19 | 9.2 | C | D | C | D |
| Comparative Example 4 | F-35 | 1.44 | 1.31 | 9.0 | C | C | B | C |

As can be seen from the results shown in Table 4, the evaluation results of Examples 1 to 45 were satisfactory. The developer carrying member F-32 of Comparative Example 1 did not include in the acrylic resin the unit (1) and the unit (3) and was insufficient in abrasion resistance, and hence the image density difference between at the initial stage and after the 50,000-sheet printing was poor, and the density unevenness evaluation and the image quality evaluation after the 50,000-sheet printing were also poor. The developer carrying members F-33 and F-34 of Comparative Examples 2 and 3, respectively, did not include the unit (2) in the acrylic resin and were low in the charge imparting capability, and hence were low in the image density and also poor in the density unevenness evaluation and the image quality evaluation at the initial stage and after the 50,000-sheet printing. The developer carrying member F-35 of Comparative Example 4 was poor in the density unevenness evaluation and in the image quality evaluation because the number of the carbon atoms in the alkyl group represented by $R_7$ in the structure of the acrylic resin was as large as 22, and hence the dispersibility of the acrylic resin with respect to the electroconductive particles was insufficient.

EXAMPLE 32

<Production of Developer Carrying Member G-36>

A coating liquid was obtained in the same manner as in Example 1 except that the composition of the coating liquid was set to have the following proportions.

Acrylic resin solution A-1: Solid content: 50 parts by mass (125 parts by mass as solution)

Penolic resin: Solid content: 50 parts by mass (83.3 parts by mass as solution)

Electroconductive particles C-1: 4 parts by mass

Electroconductive particles C-2: 36 parts by mass

Unevenness-imparting particles D-1: 12 parts by mass

Isopropyl alcohol: 175 parts by mass

Next, the developer carrying member G-36 was obtained by forming and curing the coating film under the same conditions as in Example 1 except that the number of rotations of the substrate was set at 1000 rpm, the descent rate of the air spray gun was set at 30 mm/sec, and the coating film thickness after curing was designed to be 12 µm.

<Fabrication of Electrophotographic Image Forming Apparatus, and Image Evaluation Using the Same>

A magnetic roller was inserted into the obtained developer carrying member G-36, flanges were attached to the both ends of the developer carrying member G-36, and the developer carrying member G-36 was mounted as the developing roller in the developing unit of an electrophotographic image forming apparatus, iR2545 (trade name, manufactured by Canon Inc.). The space between the magnetic doctor blade and the developer carrying member G-36 was set at 220 µm. The resulting developing unit was mounted in the above-described electrophotographic image forming apparatus, and the below-described image evaluation was performed. The image evaluation was performed in a high-temperature high-humidity environment (temperature: 30° C., humidity: 80% RH, H/H). For the image evaluation, an A4-sized ordinary paper, CS-680 (trade name, manufactured by Canon Inc., 68 g/m$^2$) was used, and an image print-out test was performed in which a continuous copying of the character image of a 3% coverage rate was performed on 500,000 sheets by transverse feed (A4 landscape). The results thus obtained are shown in Table 6.

The image evaluations of (1) the image density, (2) the density unevenness and (3) the image quality evaluation were performed in the same manner as in Example 1 except that the image evaluations of (1) the image density, (2) the density unevenness and (3) the image quality evaluation were each performed at the initial stage and after the 500,000 sheet image print-out.

EXAMPLES 33 TO 42 AND COMPARATIVE EXAMPLES 5 TO 8

<Production of Developer Carrying Members G-37 to G-46 and H-47 to H-50>

The developer carrying members G-37 to G-46 and H-47 to H-50 were prepared in the same manner as in Example 32 except that the coating liquids shown in Table 5 were respectively used.

<Fabrication of Electrophotographic Image Forming Apparatus, and Image Evaluation Using the Same>

The obtained developer carrying members G-37 to G-46 and H-47 to H-50 were each incorporated into the developing unit to obtain a developing apparatus. The resulting developing apparatuses were each mounted in the electrophotographic image forming apparatus in the same manner as in Example 32, and the image evaluations were performed in the same manner as in Example 32. The results thus obtained are shown in Table 6.

TABLE 5

| Developer carrying member | Acrylic resin | | Other resin | | Electroconductive particles 1 | | Electroconductive particles 2 | | Unevenness-imparting particles | |
|---|---|---|---|---|---|---|---|---|---|---|
| | Type | parts (solid content) | Type | parts (solid content) | Type | parts | Type | parts | Type | parts |
| G-36 | A-1 | 50 | Phenolic | 50 | C-1 | 4 | C-2 | 36 | D-1 | 12 |
| G-37 | A-1 | 10 | Phenolic | 90 | C-1 | 4 | C-2 | 36 | D-1 | 12 |
| G-38 | A-1 | 50 | Melamine | 50 | C-1 | 4 | C-2 | 36 | D-1 | 12 |
| G-39 | A-1 | 50 | Silicone | 50 | C-1 | 4 | C-2 | 36 | D-1 | 12 |
| G-40 | A-8 | 50 | Phenolic | 50 | C-1 | 4 | C-2 | 36 | D-1 | 12 |
| G-41 | A-11 | 10 | Phenolic | 90 | C-1 | 4 | C-2 | 36 | D-1 | 12 |
| G-42 | A-15 | 50 | Melamine | 50 | C-1 | 4 | C-2 | 36 | D-1 | 12 |
| G-43 | A-17 | 50 | Phenolic | 50 | C-1 | 4 | C-2 | 36 | D-1 | 12 |
| G-44 | A-18 | 50 | Phenolic | 50 | C-1 | 4 | C-2 | 36 | D-1 | 12 |
| G-45 | A-21 | 50 | Phenolic | 50 | C-1 | 4 | C-2 | 36 | D-1 | 12 |
| G-46 | A-1 | 100 | None | — | C-1 | 4 | C-2 | 36 | D-1 | 12 |
| H-47 | a-31 | 50 | Phenolic | 50 | C-1 | 4 | C-2 | 36 | D-1 | 12 |
| H-48 | a-32 | 50 | Phenolic | 50 | C-1 | 4 | C-2 | 36 | D-1 | 12 |
| H-49 | a-33 | 50 | Phenolic | 50 | C-1 | 4 | C-2 | 36 | D-1 | 12 |
| H-50 | a-30 | 50 | Phenolic | 50 | C-1 | 4 | C-2 | 36 | D-1 | 12 |

TABLE 6

| | Developer carrying member | Image density | | Density decrease rate (%) | Density decrease | | Image quality evaluation | |
|---|---|---|---|---|---|---|---|---|
| | | Initial stage | After 500,000-sheet printing | rate (%) | Initial stage | After 500,000-sheet printing | Initial stage | After 500,000-sheet printing |
| Example 32 | G-36 | 1.43 | 1.35 | 5.6 | A | A | A | A |
| Example 33 | G-37 | 1.40 | 1.33 | 5.0 | A | A | A | A |
| Example 34 | G-38 | 1.44 | 1.37 | 4.9 | A | A | A | A |
| Example 35 | G-39 | 1.42 | 1.30 | 8.5 | A | B | A | B |
| Example 36 | G-40 | 1.38 | 1.31 | 5.1 | A | B | B | B |
| Example 37 | G-41 | 1.42 | 1.33 | 6.3 | A | B | A | B |
| Example 38 | G-42 | 1.40 | 1.36 | 2.9 | A | A | A | A |
| Example 39 | G-43 | 1.38 | 1.35 | 2.2 | A | A | A | A |
| Example 40 | G-44 | 1.44 | 1.34 | 6.9 | A | B | A | B |
| Example 41 | G-45 | 1.39 | 1.33 | 4.3 | A | B | A | A |
| Example 42 | G-46 | 1.45 | 1.33 | 8.3 | A | B | A | B |
| Comparative Example 5 | H-47 | 1.41 | 1.23 | 12.8 | B | D | B | D |
| Comparative Example 6 | H-48 | 1.31 | 1.20 | 8.4 | B | D | B | D |
| Comparative Example 7 | H-49 | 1.32 | 1.18 | 10.6 | B | D | B | D |
| Comparative Example 8 | H-50 | 1.44 | 1.28 | 11.1 | C | D | C | D |

As can be seen from Table 6, the evaluation results of Examples 32 to 42 were satisfactory. The developer carrying member H-47 of Comparative Example 5 did not include in the acrylic resin the unit (1) and the unit (3) and was insufficient in abrasion resistance, and hence the image density difference between at the initial stage and after the 500,000-sheet printing was poor, and the density unevenness evaluation and the image quality evaluation after the 500,000-sheet printing were also poor. The developer carrying members H-48 and H-49 of Comparative Examples 6 and 7, respectively, did not include the unit (2) in the acrylic resin and were low in the charge imparting capability, and hence were low in the image density and also poor in the density unevenness evaluation and the image quality evaluation at the initial stage and after the 500,000-sheet printing. The developer carrying member F-50 of Comparative Example 8 was poor in the density unevenness evaluation and in the image quality evaluation because the number of the carbon atoms in the alkyl group represented by $R_7$ in the structure of the acrylic resin was as large as 22, and hence the compatibility of the acrylic resin with the phenolic resin was poor and the dispersibility of the acrylic resin with respect to the electroconductive particles was insufficient, and consequently the density unevenness evaluation and the image quality evaluation were poor.

EXAMPLE 43

<Production of Developer Carrying Member I-51>

A coating liquid was obtained in the same manner as in Example 1 except that the composition of the coating liquid was set to have the following proportions.
- Acrylic resin solution A-1: Solid content: 100 parts by mass (250 parts by mass as solution)
- Electroconductive particles C-1: 3.3 parts by mass
- Electroconductive particles C-2: 30 parts by mass
- Unevenness-imparting particles D-1: 10 parts by mass
- Isopropyl alcohol: 100 parts by mass Next, the developer carrying member I-51 was obtained by forming and curing the coating film under the same conditions as in Example 1 except that the number of rotations of the substrate was set at 1500 rpm, the descent rate of the air spray gun was set at 35 mm/sec, and the coating film thickness after curing was designed to be 10 μm.

<Fabrication of Electrophotographic Image Forming Apparatus, and Image Evaluation Using the Same>

The obtained developer carrying member I-51 was incorporated into the magenta cartridge, EP82 (trade name, manufactured by Canon Inc.) of a printer, LBP2160 (trade name, manufactured by Canon Inc.) to form a developing apparatus. The developing apparatus was mounted in the above-described printer, and the below-described image evaluation was performed. For the purpose of strengthen the regulation to the toner, the contact pressure of the toner regulation blade was set at 30 g/cm in terms of linear pressure in the lengthwise direction of the developer carrying member. The image evaluation was performed in a high-temperature high-humidity environment (temperature: 32.5° C., humidity: 80% RH, H/H). For the image evaluation, a letter-sized paper, Business 4200 (trade name, manufactured by Xerox Corp., 75 g/m$^2$) was used, and an image print-out test was performed in which a continuous copying of the character image of a 3% coverage rate was performed on 30,000 sheets of A4 sized ordinary paper by longitudinal feed (A4 portrait). The results thus obtained are shown in Table 8.

The image evaluations of (1) the image density, (2) the density unevenness and (3) the image quality evaluation were performed in the same manner as in Example 1 except that the image evaluations of (1) the image density, (2) the density unevenness and (3) the image quality evaluation were each performed at the initial stage and after the 30,000 sheet image print-out.

COMPARATIVE EXAMPLES 9 AND 10

<Production of Developer Carrying Members J-52 and J-53>

The developer carrying members J-52 and J-53 were prepared in the same manner as in Example 43 except that the compositions of the coating liquids were set to have the proportions shown in Table 7.

<Fabrication of Electrophotographic Image Forming Apparatus, and Image Evaluation Using the Same>

The obtained developer carrying members J-52 and J-53 were each incorporated into the cartridge in the same manner as in Example 43, to form a developing apparatus. The resulting developing apparatuses were each mounted in the printer in the same manner as in Example 43, and the image evaluation was performed in the same manner as in Example 43. The results thus obtained are shown in Table 8.

TABLE 7

| Developer carrying member | Acrylic resin | | Other resin | | Electroconductive particles 1 | | Electroconductive particles 2 | | Unevenness-imparting particles | |
|---|---|---|---|---|---|---|---|---|---|---|
| | Type | parts by mass (solid content) | Type | parts by mass (solid content) | Type | parts by mass | Type | parts by mass | Type | parts by mass |
| I-51 | A-1 | 100 | None | — | C-1 | 3.3 | C-2 | 30 | D-2 | 10 |
| J-52 | a-32 | 100 | None | — | C-1 | 3.3 | C-2 | 30 | D-2 | 10 |
| J-53 | a-33 | 100 | None | — | C-1 | 3.3 | C-2 | 30 | D-2 | 10 |

TABLE 8

| Developer carrying member | Image density | | Density decrease rate (%) | Density decrease rate (%) | Image quality evaluation | Image quality evaluation |
|---|---|---|---|---|---|---|
| | Initial stage | After 30,000-sheet printing | decrease rate (%) | | | |
| | | | | Initial stage | After 30,000-sheet printing | Initial stage | After 30,000-sheet printing |

| | Developer carrying member | Initial stage | After 30,000-sheet printing | decrease rate (%) | Initial stage | After 30,000-sheet printing | Initial stage | After 30,000-sheet printing |
|---|---|---|---|---|---|---|---|---|
| Example 43 | 1-51 | 1.41 | 1.33 | 5.7 | A | B | A | B |
| Comparative Example 9 | J-52 | 1.30 | 1.19 | 8.5 | B | D | B | D |
| Comparative Example 10 | J-53 | 1.31 | 1.18 | 9.9 | B | D | B | D |

As can be seen from Table 8, the evaluation results of Example 43 were satisfactory. On the other hand, the developer carrying members J-52 and J-53 of Comparative Examples 9 and 10, respectively, did not include the unit (2) in the acrylic resin, and were low in charge imparting capability, and hence the image densities at the initial stage and after 30,000-sheet printing were low, and the density unevenness and the image quality evaluation were poor.

Preferred embodiments of the present invention will now be described in detail in accordance with the accompanying drawings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-090967, filed Apr. 9, 2010, which is hereby incorporated by reference herein in its entirety.

What is claimed is:

1. A developer carrying member comprising a substrate and a resin layer,
wherein the resin layer comprises
an acrylic resin comprising a unit represented by the following formula (1), a unit represented by the following formula (2) and a unit represented by the following formula (3), and
electroconductive particles:

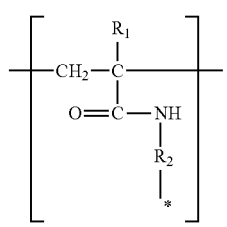
(1)

wherein $R_1$ represents a hydrogen atom or a methyl group, and $R_2$ represents an alkylene group having 1 to 4 carbon atoms; and the symbol * represents a binding portion to the portion represented by the symbol ** in formula (3),

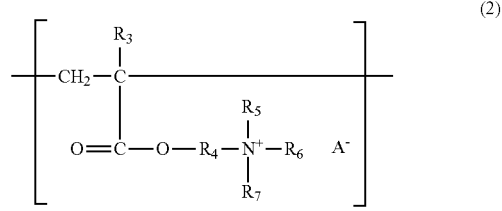
(2)

wherein $R_3$ represents a hydrogen atom or a methyl group, $R_4$ represents an alkylene group having 1 to 4 carbon atoms, $R_5$, $R_6$ and $R_7$ each independently represent an alkyl group having 1 to 18 carbon atoms, and $A^-$ represents an anion, and

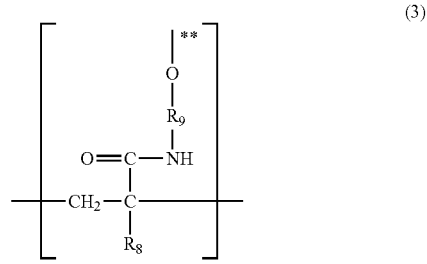
(3)

wherein $R_8$ represents a hydrogen atom or a methyl group, and $R_9$ represents an alkylene group having 1 to 4 carbon atoms; and the symbol ** represents a binding portion to the portion represented by the symbol * in formula (1).

2. The developer carrying member according to claim 1, wherein at least one of $R_5$, $R_6$ and $R_7$ in the unit represented by the formula (2) is an alkyl group having 8 to 18 carbon atoms.

3. The developer carrying member according to claim 1, wherein:
the resin layer comprises a phenolic resin or a melamine resin, and
the acrylic resin comprises the unit represented by the following formula (4); and wherein
the acrylic resin is bound to the phenolic resin or the melamine resin at the position represented by the symbol *** in the following formula (4):

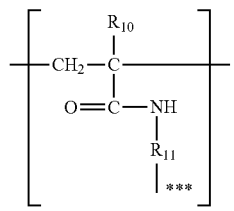

(4)

wherein $R_{10}$ represents a hydrogen atom or a methyl group, and $R_{11}$ represents a alkylene group having 1 to 4 carbon atoms.

4. A method for manufacturing a developer carrying member comprising a substrate and a resin layer, wherein:
the resin layer comprises at least an acrylic resin and electroconductive particles, and the acrylic resin is obtained by the following polymerization reactions [A] and [B]:
polymerization reaction [A]: a radical polymerization reaction between the monomer represented by the following formula (5) and the monomer represented by the following formula (6)
polymerization reaction [B]: dehydration polycondensation reaction between the hydroxyl groups of the monomers represented by the following formula (5)

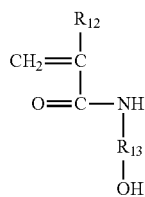

(5)

wherein $R_{12}$ represents a hydrogen atom or a methyl group, and $R_{13}$ represents a alkylene group having 1 to 4 carbon atoms, and

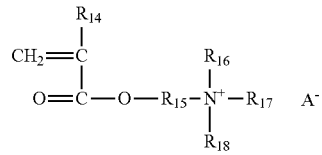

(6)

wherein $R_{14}$ represents a hydrogen atom or a methyl group, $R_{15}$ represents an alkylene group having 1 to 4 carbon atoms, $R_{16}$, $R_{17}$ and $R_{18}$ each independently represent an alkyl group having 1 to 18 carbon atoms, and $A^-$ represents an anion.

5. A developing apparatus comprising a negatively chargeable developer which comprises toner particles, a container containing the developer, a developer carrying member for carrying and conveying the developer stored in the container, and a developer thickness regulating member,
wherein the developer carrying member is the developer carrying member according to claim 1.

\* \* \* \* \*